(12) United States Patent
Wen et al.

(10) Patent No.: US 12,539,934 B2
(45) Date of Patent: Feb. 3, 2026

(54) FOLDING JOINT

(71) Applicant: Huizhou Kaisheng Bicycle Co., Ltd., Huizhou (CN)

(72) Inventors: Xun Wen, Dongguan (CN); Bing Yan, Dongguan (CN); Heping Jiang, Dongguan (CN)

(73) Assignee: DONGGUAN KAISHENG BICYCLE CO., LTD, Dongguan (CN)

( * ) Notice: Subject to any disclaimer, the term of this patent is extended or adjusted under 35 U.S.C. 154(b) by 288 days.

(21) Appl. No.: 18/355,720

(22) Filed: Jul. 20, 2023

(65) Prior Publication Data

US 2023/0358260 A1    Nov. 9, 2023

Related U.S. Application Data

(63) Continuation of application No. PCT/CN2021/081609, filed on Mar. 18, 2021.

(51) Int. Cl.
*B62K 15/00* (2006.01)
*F16B 2/18* (2006.01)
*F16B 7/04* (2006.01)

(52) U.S. Cl.
CPC ............ *B62K 15/006* (2013.01); *F16B 2/185* (2013.01); *F16B 7/0426* (2013.01); *Y10T 403/595* (2015.01)

(58) Field of Classification Search
CPC .... B62K 15/006; B62K 15/008; B62K 21/24; F16B 2/18; F16B 2/185; F16B 7/0406; F16B 7/0426; F16B 7/22; F16C 11/103; F16L 37/18; F16L 37/20; Y10T 16/54024; Y10T 74/20792; Y10T 74/20798; Y10T 403/32254; Y10T 403/32262; Y10T 403/595; Y10T 403/599; Y10T 403/648
USPC ........... 16/324; 74/551.3, 551.4; 403/83, 84, 403/322.4, 325, 338
See application file for complete search history.

(56) References Cited

U.S. PATENT DOCUMENTS

| 5,337,609 A | 8/1994 | Hsu | |
|---|---|---|---|
| 5,492,350 A * | 2/1996 | Pan | B62K 15/006 403/322.4 |
| 9,321,500 B2 * | 4/2016 | Wang | B62K 15/006 |

(Continued)

FOREIGN PATENT DOCUMENTS

| CN | 1406808 A | 4/2003 |
|---|---|---|
| CN | 2619081 Y | 6/2004 |

(Continued)

*Primary Examiner* — Josh Skroupa
(74) *Attorney, Agent, or Firm* — JEEN IP LAW, LLC (57) ABSTRACT

A folding joint, comprising a first joint, a second joint, a handle, a locking rod, a swing back element, a connecting rod, a sliding rod and a reset elastic member, one side of the first joint (10) is hingedly connected to one side of the second joint, and the handle is hingedly connected to other side of the first joint, the other side is provided with a supporting part, and is provided with a sliding groove, one end of the swing back element is hingedly connected to the other side of the first joint, the locking rod is arranged at other end of the swing back element, the sliding rod is arranged in the sliding groove, the connecting rod is arranged between the locking rod and the sliding rod, one end of connecting rod is fixedly connected with the locking rod, other end is fixedly connected with the sliding rod.

10 Claims, 6 Drawing Sheets

(56) References Cited

U.S. PATENT DOCUMENTS

| | | | | |
|---|---|---|---|---|
| 9,533,730 B2* | 1/2017 | Yu | ............... | B62K 15/006 |
| 12,304,588 B2* | 5/2025 | Wang | ............... | F16B 7/0426 |
| 2010/0135715 A1* | 6/2010 | Huang | ............... | B62K 15/006 |
| | | | | 403/83 |

FOREIGN PATENT DOCUMENTS

| | | |
|---|---|---|
| CN | 201074621 Y | 6/2008 |
| CN | 201325547 Y | 10/2009 |
| CN | 102295049 A | 12/2011 |
| CN | 210634693 U | 5/2020 |
| CN | 211519749 U | 9/2020 |

* cited by examiner

FOLDING JOINT

CROSS-REFERENCE TO RELATED APPLICATIONS

The present application is a U.S. continuation of co-pending International Patent Application No. PCT/CN2021/081609 filed Mar. 18, 2021, in the State Intellectual Property Office of China, the contents of all of which are hereby incorporated by reference.

TECHNICAL FIELD

The present application relates to a mechanical connection structure, in particular to a folding joint used on a folding bicycle and a folding electric vehicle.

BACKGROUND

Folding bicycles are lightweight, small in size after folding, and can be carried when going up and down elevators, buses, and subways. It can be unfolded and used on the road, which is convenient for traveling, and can also be placed in the trunk of a car. You can not only experience the convenience of a car, but also enjoy the fun of riding in nature when you go outing.

Folding joints are an important part of a folding bicycles. The folding bicycle realizes rapid folding or unfolding of the bicycle through the folding joint, thereby reducing the volume of the folding bicycle and facilitating the storage or transportation of the bicycle.

Chinese patent document CN2619081Y discloses a folding joint with a four-link structure. The two connecting plates are respectively hinged on one side, and a concave platform is arranged in the middle part of the other side of each connecting plate. The ends of the adjusting rod and the handle are respectively inserted into the concave platform of a connecting plate. The hinge shaft passes through the adjusting rod or the handle and is inserted into the connecting plates on both sides of the concave platform. Turn the handle to tighten or loosen the two connecting plates through the adjusting rod.

Chinese patent document CN1406808A discloses an internal locking folding joint. Two connecting plates, respectively connected to the bars, are hinged on one side. The mating surfaces of the two connecting plates are respectively provided with concave platforms, and at least one corresponding edge of the concave platforms of the two connecting plates is respectively provided with a clamping slot. A movable clamping block with a V-shaped side is placed in the concave platform of one of the connecting plates. The two V-shaped flanges on one side of the clamping block can be simultaneously inserted into the slots on the edges of each concave table when the two connecting plates are brought together. The clamping block is driven to move by the toggle mechanism, so that the flange of the clamping block is inserted into or withdrawn from the slot. The handle of the toggle mechanism is out of one side of the connecting plate.

Existing folding joints generally include ejector-type folding joints, four-link folding joints, inner-locking folding joints and outer-locking folding joints, such as a folding joint with a four-link structure disclosed in the previous Chinese patent document CN2619081Y and an inner-locking folding joint disclosed in CN1406808A. If the user accidentally turns the handle from the locked position to a certain angle, the folding joint will be loosened, which poses a safety hazard and does not meet the safety standards of some countries or regions.

SUMMARY

The purpose of the present application is to provide a folding joint with high safety and reliability.

The technical scheme adopted by the folding joint disclosed by the present application is:

A folding joint, comprising a first joint, a second joint, a handle, a locking rod, a swing back element, a connecting rod, a sliding rod and a reset elastic member, one side of the first joint is hingedly connected to one side of the second joint, and the handle is hingedly connected to other side of the first joint, the other side of the second joint is provided with a supporting part, and the handle is also provided with a sliding groove, one end of the swing back element is hingedly connected to the other side of the first joint, and the locking rod is arranged at other end of the swing back element, the sliding rod is arranged in the sliding groove of the handle, and the connecting rod is arranged between the locking rod and the sliding rod, and one end of connecting rod is fixedly connected with the locking rod, and other end is fixedly connected with the sliding rod, the reset elastic member is configured to rotate the locking rod at the other end of the swing back element toward the supporting part on the second joint, turn the handle, the sliding rod slides to one end of the sliding groove and tightens the locking rod on the supporting part through the connecting rod.

As a preferred solution, the side of the supporting part abutting against the locking rod is configured to be slightly concave inward.

As a preferred solution, an outer side of the supporting part is configured as a rounded surface.

As a preferred solution, one end of the swing back element is provided with a long hole, and the other end is provided with a round hole.

As a preferred solution, the reset elastic member is a torsion spring, one end of the swing back member and one end of the handle are hingedly connected to the other side of the first joint by a hinge shaft, and the hinge shaft passes through the long hole at one end of the swing back member, the torsion spring is sleeved on the hinge shaft, one end of the torsion spring abuts against the first joint, and the other end abuts against the swing back member.

As a preferred solution, a first hinge ear is provided on the other side of the first joint, a hinge hole is provided on the first hinge ear, and the hinge shaft passes through the hinge hole.

As a preferred solution, one end of the connecting rod is provided with an external adjustment thread, the other end is provided with a connecting threaded hole, the locking rod is provided with a through hole, and the sliding rod is provided with an adjustment threaded hole, one end of the connecting rod is screwed to the sliding rod, and the other end of the connecting rod is threadedly connected to the locking rod through a screw passing through a through hole on the locking rod.

As a preferred solution, the handle is provided with a self-locking mechanism.

As a preferred solution, the self-locking mechanism comprises a snap button and a reset spring, one end of the snap button is provided with a hook portion, and the other end is provided with a pressing portion and a reset spring accommodation groove, and the pressing portion and the reset spring accommodation groove are respectively located on the two sides of the other end of the snap button, a convex portion and a connection hole are provided in middle of the snap button, a step installation hole is provided on the handle, connection holes are provided on both sides of the step installation hole, and the snap button is installed in the step installation hole through a connecting shaft, the connecting shaft passes through the connection holes on the snap button and the step installation hole on the handle, the snap button passes through the handle, one end of the reset spring abuts against the handle, and the other end is arranged in the return spring accommodation groove on the snap button, and the second joint is provided with a self-locking hook hole.

As a preferred solution, the handle is provided with a sinking groove, and the sinking groove is arranged at bottom of the step installation hole, and one end of the reset spring is arranged in the sinking groove on the handle.

The beneficial effects of the folding joint disclosed by the present invention are: Under the action of the reset elastic member, the swing back member drives the locking rod to rotate towards the supporting part, and the locking rod moves along the outside of the supporting part to the top of the supporting part. Turn the handle, the sliding rod slides in the sliding groove. When the sliding rod slides to one end of the sliding rod, the end of the sliding groove of the handle bears against the sliding rod, and the sliding rod pushes the connecting rod and the locking rod to move to the concave surface of the supporting part, so that the locking rod presses against the supporting part, to achieve locking. When the folding joint is released, the first joint and the second joint can only be opened by turning the handle and turning the handle at a sufficient angle to drive the locking rod away from the supporting part. That is, even if the handle rotates at a certain angle, due to the effect of the torsion spring, the locking rod is located above the supporting part, and the first joint and the second joint cannot be folded, which improves the safety of the folding joint.

BRIEF DESCRIPTION OF DRAWINGS

3 is a schematic structural diagram of a second joint of a folded joint according to the present application.

DETAILED DESCRIPTION

Figure 1:
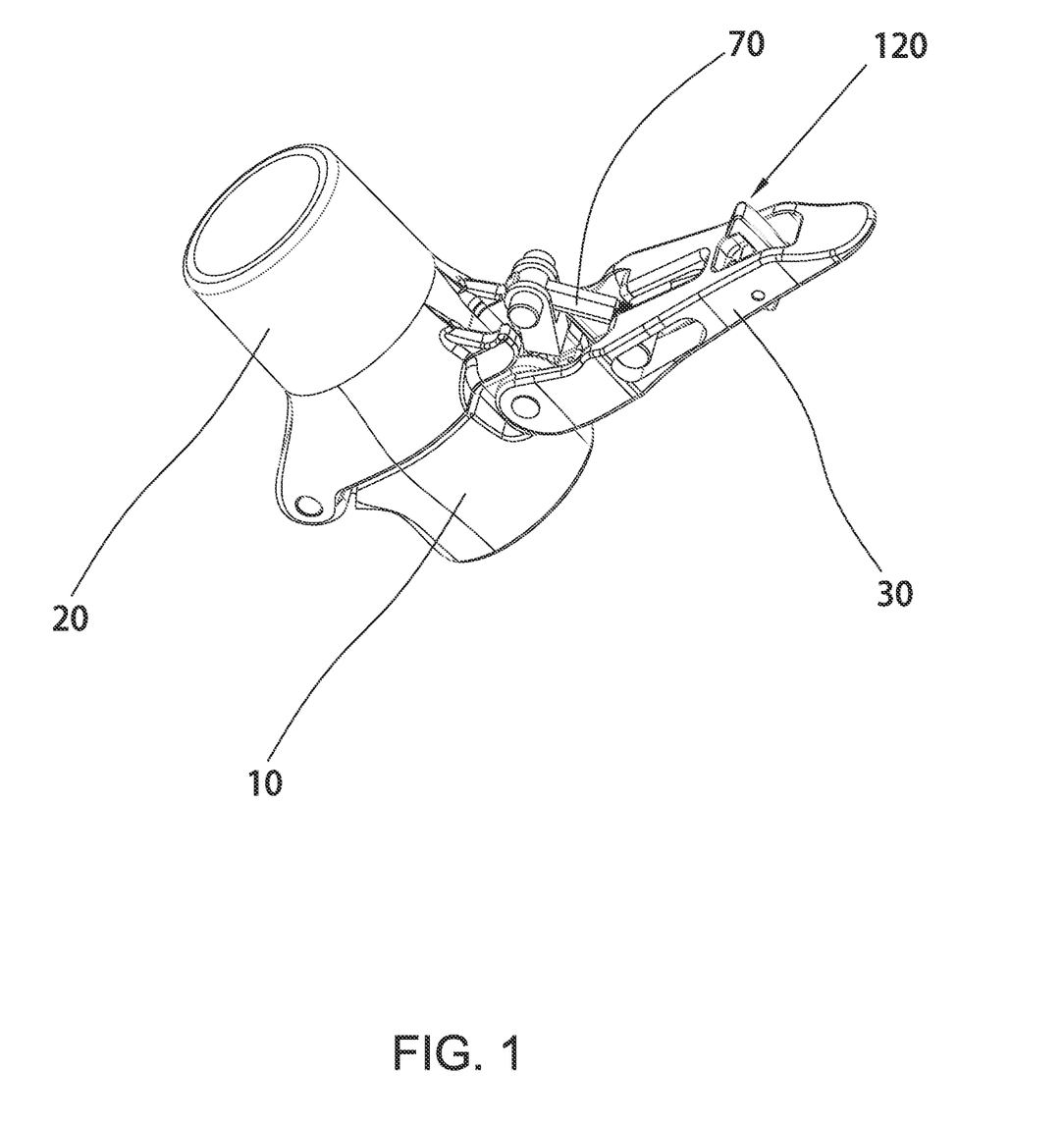
FIG. 1 is a schematic diagram of a folded joint according to the present application.
Figure 2:
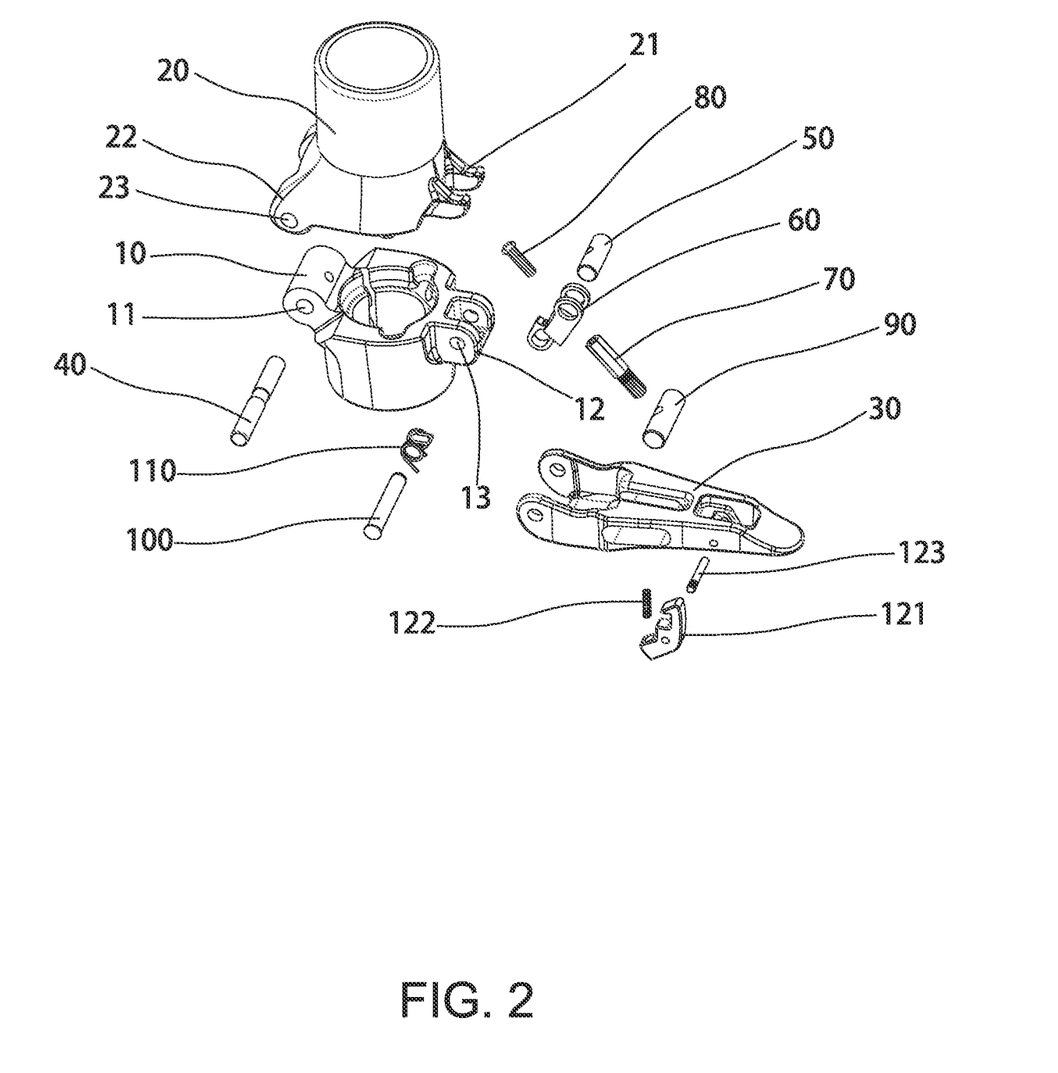
FIG. 2 is a schematic structural exploded view of a folded joint according to the present application.

Below in conjunction with specific embodiment and accompanying drawing, the present invention is further elaborated and illustrated:

Please refer to FIG. 1 and FIG. 2, a folding joint comprises a first joint 10, a second joint 20, a handle 30, a locking rod 50, a swing back member 60, a connecting rod 70, a sliding rod 90 and a reset elastic member 110. In this embodiment, the reset elastic member 110 is a torsion spring.

Figure 3:
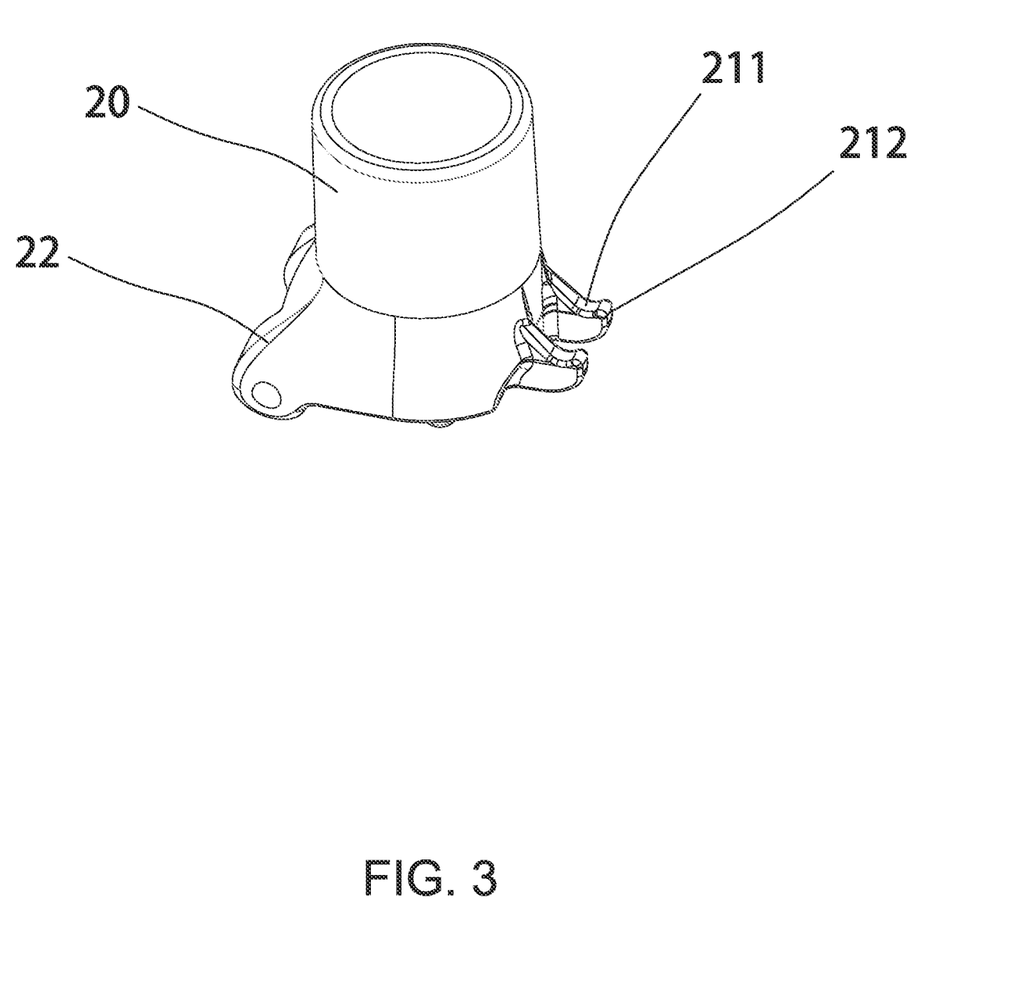

One side of the first joint 10 is provided with a first reaming hole 11, and the other side is provided with a first hinge ear 12, and the first hinge ear 12 is provided with a hinge hole 13, and one of the second joint 20. One side of the second joint 20 is provided with a second hinged ear 22, the second hinged ear 22 is provided with a second reaming 23, and the other side is provided with a supporting part 21. A surface 211 of the supporting part 21 is slightly concave inward, and an outer side 212 of the supporting part 21 is a rounded surface. Please refer to FIG. 3, the first reaming hole 11 of the first joint 10 is hingedly connected with the second reaming hole 23 of the second joint 20 through a hinge shaft 40, and the second joint 20 is provided with a self-locking hook hole, not shown in FIG.

Figure 4:
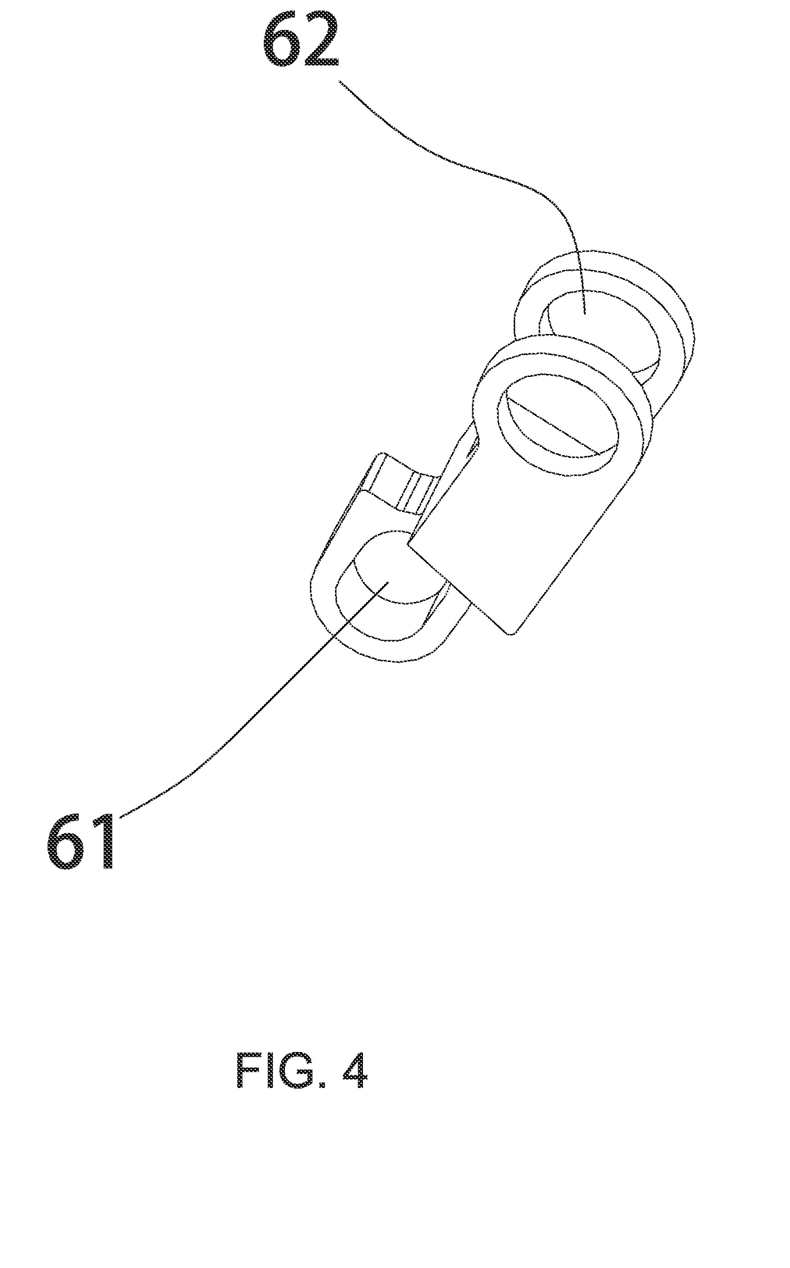
FIG. 4 is a schematic structural diagram of the swing back member of the folding joint according to the present application.

Please refer to FIG. 4, one end of the swing back member 60 is provided with a long hole 61, and the other end is provided with a round hole 62.

Figure 5:
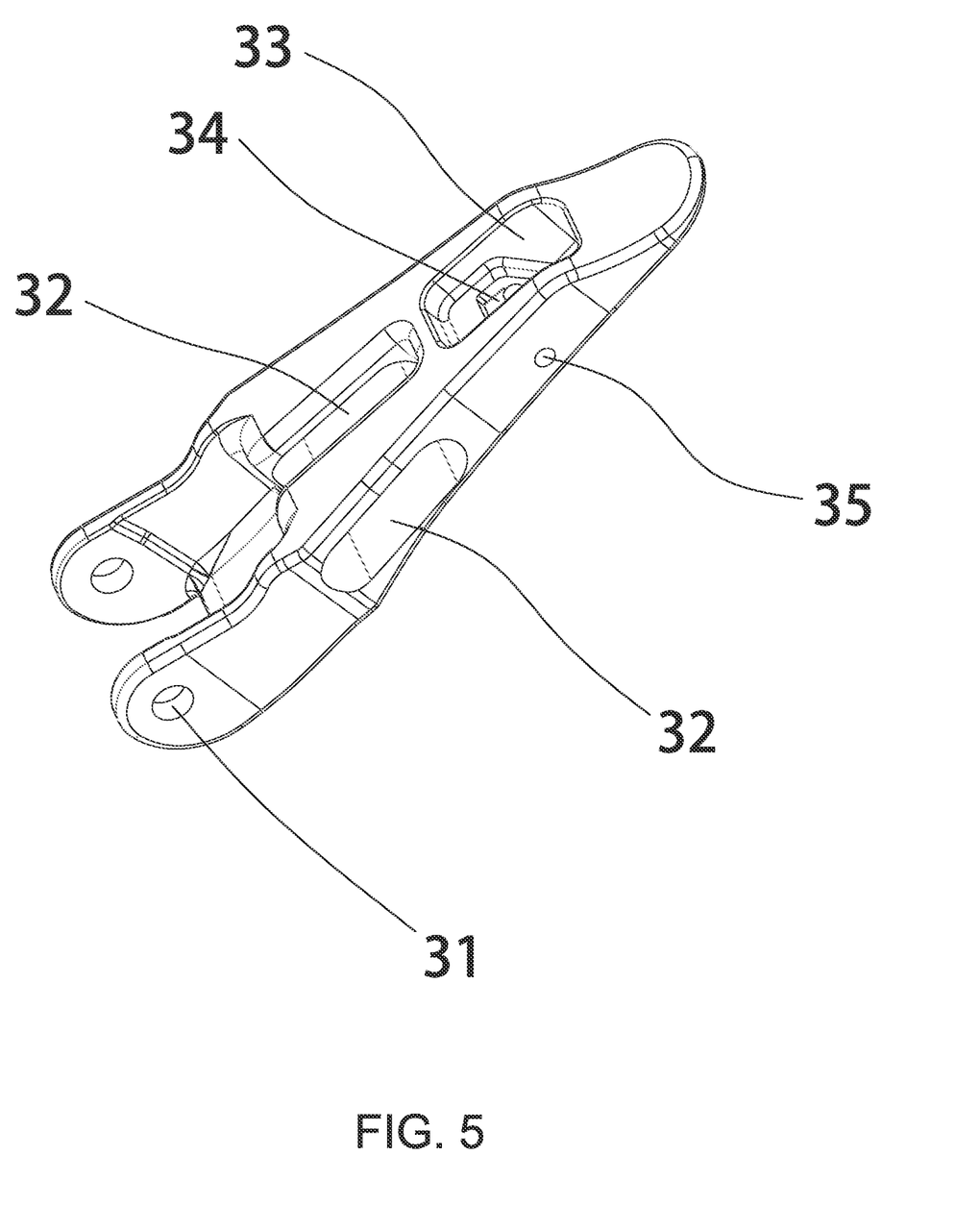
FIG. 5 is a structural schematic diagram of a handle of a folding joint according to the present application.

Please refer to FIG. 5, one end of the handle 30 is provided with a hinge shaft hole 31, and the other end is provided with a handle. The handle 30 is provided with a step installation hole 33, a sinking groove 34 and a sliding groove 32. The sinking groove 34 is located at the bottom of the s step installation hole 33. Connecting holes 35 are provided on both sides of the step installation hole 33. A connecting shaft 123 is disposed in the connecting hole 35, and the connecting shaft 123 installs the snap button 121 in the step installation hole 33.

Figure 6:
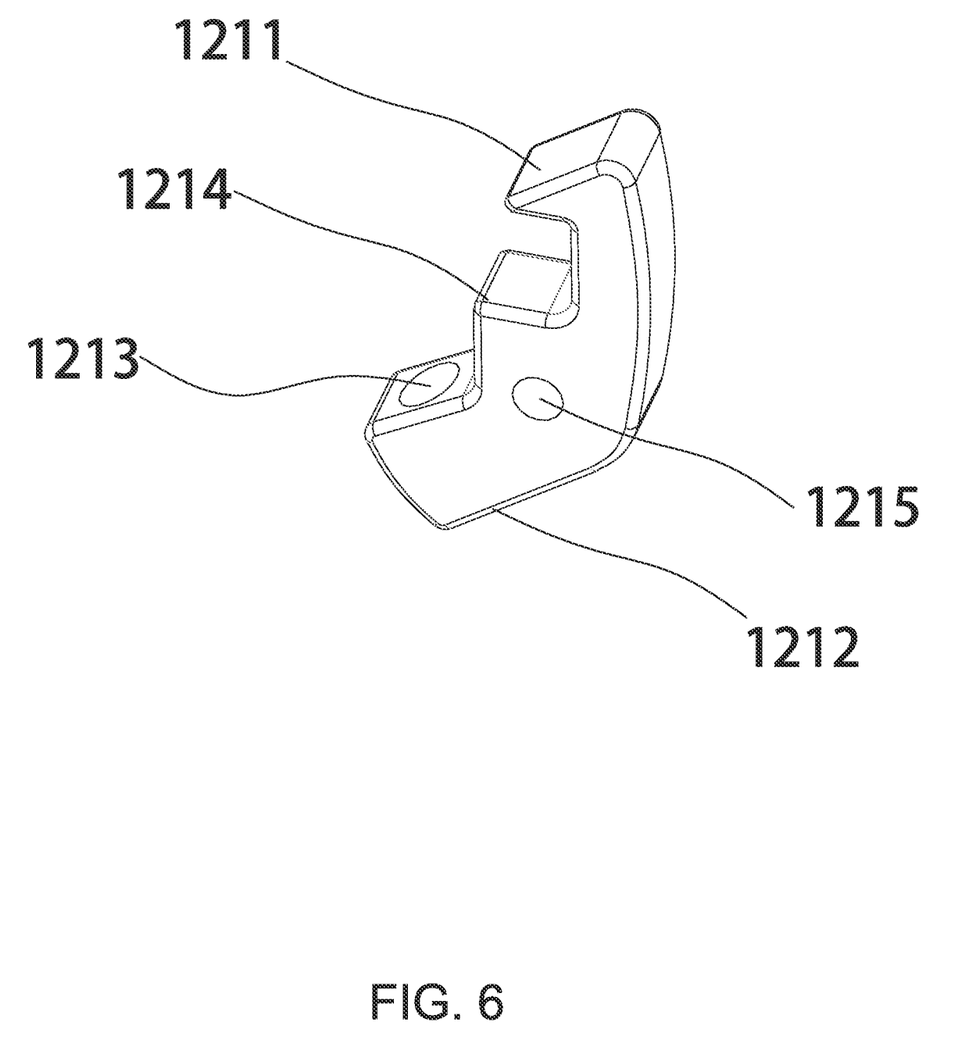
FIG. 6 is a schematic structural diagram of a snap button of a folding joint according to the present application.

Please refer to FIG. 6, one end of the snap button 121 is provided with a hook portion 1211, and the other end is provided with a pressing portion 1212 and a reset spring accommodation groove 1213, and the pressing portion 1212 and the reset spring accommodation groove 1213 are respectively located on the two sides of the other end of the snap button 121, a convex portion 1214 and a connection hole 1215 are provided in middle of the snap button 121. The connecting shaft 123 passes through the connection holes 1215 on the snap button 121 and the step installation hole 33 on the handle, the snap button 121 passes through the handle 30. One end of the reset spring 122 is disposed in the sinking groove 34 of the handle 30, and the other end is disposed in the reset spring accommodation groove 1213 on the snap button 121.

The handle 30 and the swing-back member 60 is hingedly connected to the first hinge ear of the first joint 10 by the hinge shaft 100 passed through the hinge shaft hole 31 on the handle 30, the long hole 61 of the swing back member 60 and the hinge hole 13 on the first hinge ear 12. A torsion spring 110 is sleeved on the hinge shaft 100, one end of the torsion spring 110 abuts on the first joint 10, and the other end abuts on the back swing member 60, so that the other end of the back swing member 60 rotates toward the supporting part 21 on the second joint 20. The locking rod 50 is arranged in the round hole 62 at the other end of the swing back member 60. The sliding rod 90 is arranged in the sliding groove 32 of the handle 30, and the connecting rod 70 is arranged between the locking rod 50 and the sliding rod 90. One end of the connecting rod 70 is provided with an external adjustment thread, and the other end is provided with a connecting threaded hole. The locking rod 50 is provided with a through hole, and the sliding rod 90 is provided with an adjustment threaded hole, one end of the connecting rod 70 is screwed to the sliding rod 90, and the other end of the connecting rod 70 is threadedly connected to the locking rod 50 through a screw passing through a through hole on the locking rod 50.

Under the action of the reset elastic member 110, the swing back member 60 drives the locking rod 50 to rotate towards the supporting part 21, and the locking rod 50 moves along the rounded surface at outside of the supporting part 21 to the slightly concave surface 211. Turn the handle 30, the sliding rod 90 slides in the sliding groove. When the sliding rod 90 slides to one end of the sliding rod 32, the sliding groove of the handle 30 bears against the sliding rod 90, and the sliding rod 90 pushes the connecting rod 70 and the locking rod 50 to move to the concave surface 211 of the supporting part 21, so that the locking rod 50 presses against the supporting part 21, to achieve locking. Since the side of the supporting part 21 abutting against the locking rod 50 is slightly concave inward, the locking rod 50 is not easy to slide on the surface of the supporting part 21 when locking. When loosening the folding joint, turn the handle 30 and make the handle 30 turn a sufficient angle, the sliding rod 90 slides to the other end of the sliding groove 32, and drives the connecting rod 70 and the locking rod 50 to move away from the supporting part 21, so that the first joint 10 and the second joint 20 are released. That is, even if the handle 30 rotates at a certain angle, as long as the sliding rod 90 does not move the locking rod 50 from the top of the supporting part 21 through the connecting rod 70, due to the effect of the torsion spring 110, the locking rod 50 will still be positioned above the supporting part 21, the first joint 10 and the second joint 20 still cannot be folded, which avoids easy folding of the folded joint due to accidents, and improves the safety of the folded joint. The hook portion 1211 of the snap button 121 is arranged in the self-locking hook hole of the second joint 20, and is used for locking the handle 30, preventing the handle 30 from rotating, and playing the role of double self-locking. When the handle 30 needs to be opened, press the snap button 121 to make the hook 1211 of the snap button 121 disengage from the self-locking hook hole, and then the handle 30 can be rotated.

It should be noted that, by arranging a long hole 61 at one end of the swing back member 60, the handle 30 is rotated to move the swing back member 60 downward, and the locking rod 50 is pushed against the supporting part 21 to achieve a locking effect. Since the supporting part 21 is not wide, even if one end of the swing back member 60 is not provided with a long hole, the elastic deformation of the sliding rod 90, the connecting rod 70 and the locking rod 50 can be used to make the locking rod 50 push against the supporting part to achieve locking.

Finally, it should be noted that the above examples are only used to illustrate the technical solutions of the present application, rather than limiting the protection scope of the present application. Although the present application has been described in detail with reference to preferred embodiments, those skilled in the art should understand that the technical solutions of the present application can be modified or equivalently replaced without departing from the spirit and scope of the technical solutions of the present application.

What is claimed is:

1. A folding joint, comprising:
    a first joint,
    a second joint,
    a handle,
    a locking rod,
    a swing back element,
    a connecting rod,
    a sliding rod, and
    a reset elastic member,
    one side of the first joint is hingedly connected to one side of the second joint, and the handle is hingedly connected to other side of the first joint, the other side of the second joint is provided with a supporting part, and the handle is also provided with a sliding groove,
    one end of the swing back element is hingedly connected to the other side of the first joint, and
    the locking rod is arranged at the other end of the swing back element,
    the sliding rod is arranged in the sliding groove of the handle, and
    the connecting rod is arranged between the locking rod and the sliding rod, and
    one end of connecting rod is fixedly connected with the locking rod, and the other end is fixedly connected with the sliding rod,
    the reset elastic member is configured to rotate the locking rod at the other end of the swing back element toward the supporting part on the second joint, wherein
    in response to turning the handle, the sliding rod slides to one end of the sliding groove and tightens the locking rod on the supporting part through the connecting rod.

2. The folding joint according to claim 1, wherein the side of the supporting part abutting against the locking rod is configured to be slightly concave inward.

3. The folding joint according to claim 2, wherein an outer side of the supporting part is configured as a rounded surface.

4. The folding joint according to claim 1, wherein one end of the swing back element is provided with a long hole, and the other end is provided with a round hole.

5. The folding joint according to claim 4, wherein the reset elastic member is a torsion spring, one end of the swing back member and one end of the handle are hingedly connected to the other side of the first joint by a hinge shaft, and the hinge shaft passes through the long hole at one end of the swing back member, the torsion spring is sleeved on the hinge shaft, one end of the torsion spring abuts against the first joint, and the other end abuts against the swing back member.

6. The folding joint according to claim 5, wherein a first hinge ear is provided on the other side of the first joint, a hinge hole is provided on the first hinge ear, and the hinge shaft passes through the hinge hole.

7. The folding joint according to claim 1, wherein one end of the connecting rod is provided with an external adjustment thread, the other end is provided with a connecting threaded hole, the locking rod is provided with a through hole, and the sliding rod is provided with an adjustment threaded hole, one end of the connecting rod is screwed to the sliding rod, and the other end of the connecting rod is threadedly connected to the locking rod through a screw passing through a through hole on the locking rod.

8. The folding joint according to claim 1, wherein the handle is provided with a self-locking mechanism.

9. The folding joint according to claim 1, wherein the self-locking mechanism comprises a snap button and a reset spring, one end of the snap button is provided with a hook portion, and the other end is provided with a pressing portion and a reset spring accommodation groove, and the pressing portion and the reset spring accommodation groove are respectively located on the two sides of the other end of the snap button, a convex portion and a connection hole are provided in the middle of the snap button, a step installation hole is provided on the handle, connection holes are provided on both sides of the step installation hole, and the snap button is installed in the step installation hole through a connecting shaft, the connecting shaft passes through the connection holes on the snap button and the step installation hole on the handle, the snap button passes through the handle, one end of the reset spring abuts against the handle, and the other end is arranged in the return spring accommodation groove on the snap button, and the second joint is provided with a self-locking hook hole.

10. The folding joint according to claim 9, wherein the handle is provided with a sinking groove, and the sinking groove is arranged at bottom of the step installation hole, and one end of the reset spring is arranged in the sinking groove on the handle.

\* \* \* \* \*